United States Patent

Nelson et al.

Patent Number: 5,816,827
Date of Patent: *Oct. 6, 1998

[54] PERFORMANCE OF ADD IN PRINTED CIRCUIT CARDS FOR COMPUTER SYSTEMS

[75] Inventors: Daryl J. Nelson, Beaverton, Oreg.; Duncan D. MacGregor, Shingle Springs, Calif.

[73] Assignee: Intel Corporation, Santa Clara, Calif.

[*] Notice: The term of this patent shall not extend beyond the expiration date of Pat. No. 5,605,463

[21] Appl. No.: 838,348

[22] Filed: Apr. 8, 1997

Related U.S. Application Data

[63] Continuation of Ser. No. 372,670, Jan. 13, 1995, which is a continuation-in-part of Ser. No. 243,395, May 16, 1994, Pat. No. 5,605,463.

[51] Int. Cl.$^6$ ...................................................... H01R 9/09
[52] U.S. Cl. ............................................. 439/64; 439/946
[58] Field of Search .............................. 439/64, 108, 607, 439/101, 59, 76.1, 946

[56] References Cited

U.S. PATENT DOCUMENTS

| | | | |
|---|---|---|---|
| 5,161,989 | 11/1992 | Okubo et al. .......................... | 439/64 X |
| 5,207,586 | 5/1993 | MacGregor et al. ............ | 439/76.1 OR |
| 5,324,204 | 6/1994 | Lwee ................................... | 439/64 OR |
| 5,389,001 | 2/1995 | Broschard, III et al. .............. | 439/64 X |
| 5,399,105 | 3/1995 | Kaufman et al. ................. | 439/609 OR |

*Primary Examiner*—P. Austin Bradley
*Assistant Examiner*—Daniel Wittels
*Attorney, Agent, or Firm*—Blakely, Sokoloff, Taylor & Zafman

[57] ABSTRACT

An improved printed circuit card for add in functions for computer systems which adds bandwidth to such cards through additional bus type connectors without changing the form factor.

The basic card add in system consist of a card having a printed circuit board surrounded and supported by a frame. A connector socket is mounted to the frame and electrically connected to the printed circuit board. The card has top and bottom covers attached to the frame which enclose the printed circuit board and a portion of the socket. The portion of the existing system located in the host consists of a header which is electrically and mechanically connected to the mother board in the digital computer system. The header has a connector which is electrically connected to the mother board and is adapted to mate with the connector socket in the card. The card and header conform to the PCMCIA standard.

Up to 34 electrically conductive and mechanically deformable interconnects are mounted on one or both sides of the card substantially adjacent to the connector and electrically connected to the printed circuit board. The interconnects are accessible through the covers of the card. On the header, a plurality of electrically conductive interconnects are mounted and electrically connected to the mother board and positioned to make electrical contact with the interconnects mounted on the card when the card is inserted into the header. The form factor of the card and position of the connector remains unchanged.

6 Claims, 9 Drawing Sheets

PERFORMANCE OF ADD IN PRINTED CIRCUIT CARDS FOR COMPUTER SYSTEMS

CROSS-REFERENCE TO RELATED APPLICATIONS

This application is a continuation of Nelson, Ser. No. 08/372,670, filed Jan. 13, 1995 which is a Continuation-in-Part of Ser. No. 08/243,395, May 16, 1995, U.S. Pat. No. 5,605,463.

BACKGROUND OF THE INVENTION

1. Field of the Invention

The subject invention relates to printed circuit cards for add in functions for computer systems. More particularly, the invention relates to a method and apparatus for adding bandwidth to such cards through additional bus type connectors without changing the form factor.

2. Description of the Prior Art

The PCMCIA (Personal Computer Memory Card International Association) standard was developed for the purpose of providing user installed memory and I/O functions for small form factor digital computer systems. The standard specifies a card containing a printed circuit board. This product is usually referred to as a PC card. There are three PC card formats: Types I, II and III. All three have external dimensions of 54 millimeters by 85.6 millimeters. Thicknesses vary. Type I is 3.3 millimeters thick. Type II is 5 millimeters thick and Type III is 10.5 millimeters thick. The cards look similar to a conventional credit card. The standard specifies a 68 position connector on one end. The 68 position connector plugs into a mating connector mounted on a header which is in turn mounted to a mother board or daughter board which is located inside the host. The header is U shaped with the 68 pins at the base of the U. There is a wide variation of headers including headers for different thickness cards; however, the 68 pin connector is common to all PCMCIA cards.

The original PC cards were for memory addition and thus had no interaction with external devices. I/O cards were developed later to add functions such as modems, faxes, network interfaces, multi-media interface, sound cards, etc. In order to handle I/O functions, a second connector is located on the end of the card opposite the 68 pin connector. The I/O connector reaches the outside world through a cable.

The PCMCIA standard specifies the function of each of the 68 pins in the connector. The standard supports either an 8 bit or 16 bit bus. There are four ground pins, two power pins and up to 3 free signal pins for additional functions. With only four ground pins, ground is not distributed. This effectively limits the bandwidth to about 20 mhz. With only 2 power pins, the power function is even less distributed. Indeed, the power is limited to 3.3 watts. The number of pins in the connector effectively limits the bandwidth of the system. But computer hardware continues to move ahead in performance. Thus, if the PCMCIA cards are to keep pace, a way must be found to improve their performance while retaining backwards compatibility with existing cards.

This can be done by only adding additional connector pins to the standard in such a way that backward compatibility is not sacrificed. This means for example that the physical size cannot change and the 68 pin connector must be retained and in precisely the same location that it now commands.

Sideswipe connector systems as described in the co-pending application referenced in the first section and assigned to the same Assignee as the present invention would provide additional contacts to the card. But this approach is limited to 10 pins. Also, for bus applications, the contacts must be in close proximity to the address, control and data signals. There is a specific need for more ground pins with higher bandwidth signals to deal with the added noise in higher frequency systems. And the PCMCIA standard in addition to limiting the total number of pins, also limits the number of ground pins. Ideally, the grounds must be very close physically to the data lines. The reason for requiring close proximity is to minimize the generation of common mode noise which can occur if the distance that electrical signals have to travel from input pin to ground is not kept to a minimum. Typically in high performance systems ground connections are distributed. But in the PCMCIA standard, this was not done since it was not intended for high speed operation.

An alternate concept that has been considered adds a grounding shield to the top of the 68 pin socket on the card. This solves distributed grounding across the card and is backward compatible. But, this approach requires a cutout in the top cover of the card where the connection to the 68 position connector occurs. As a result this approach does not have the mechanical strength to handle repeated insertions and removals. In addition, this approach does not solve the problem of providing additional power and signal pins. Finally, inserting a current PCMCIA card into such a socket may cause the grounding shield pins to be fouled by the paint on the top surface of such cards.

OBJECTS

It is therefore an object of this invention to provide a design for improving the performance of PCMCIA cards.

It is another object of the invention to provide a design that is backwards compatable with existing PCMCIA cards.

It is another object of the invention to provide a design that is mechanically and electrically robust.

It is another object of the invention to provide a design that is manufacturable at a cost that will allow commercially attractive pricing.

SUMMARY OF THE INVENTION

These and other objects of the invention are achieved in an improved add in card for a digital computer system. The basic card add in system consist of a card having a printed circuit board surrounded and supported by a frame. A connector socket is mounted to the frame and electrically connected to the printed circuit board. The card has top and bottom covers attached to the frame which enclose the printed circuit board and a portion of the socket. The portion of the existing system located in the host consists of a header which is electrically and mechanically connected to the mother board in the digital computer system. The header has a connector which is electrically connected to the mother board and is adapted to mate with the connector socket in the card. The card and header conform to the PCMCIA standard.

The improvement on the card comprises: up to 34 electrically conductive and mechanically deformable interconnects mounted on the card substantially adjacent to the connector socket and electrically connected to the printed circuit board. The interconnects extend above the plane of the top cover of said card. The improvement on the header consists of a plurality of electrically conductive interconnects mounted to the header and electrically connected to the mother board and positioned to make electrical contact with the electrically conductive deformable interconnects mounted on the card when the card is inserted into the header.

BRIEF DESCRIPTION OF THE DRAWING

The invention will now be described in conjunction with the Drawing wherein.

DESCRIPTION OF THE PREFERRED EMBODIMENT

Figure 1:
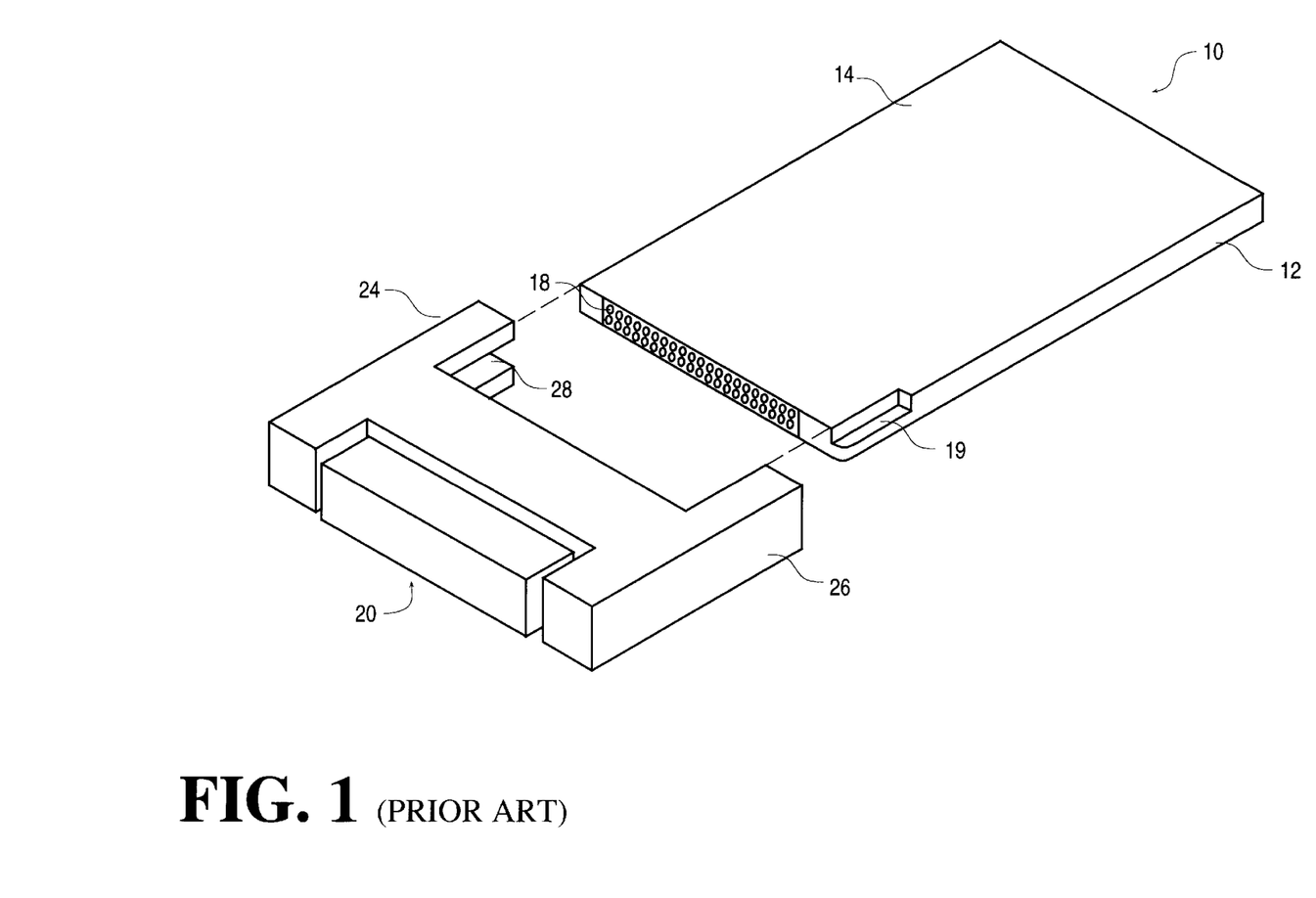
FIG. 1 is a perspective drawing of a prior art card that conforms to the PCMCIA standard.

FIG. 1 is a perspective drawing of a prior art card that conforms to the PCMCIA standard. Referring now to FIG. 1, a card 10 consists of a frame 12, a top cover 14 and a bottom cover 16 (not shown in this Figure). A 68 position connector 18 is fitted into one of the short dimension edges of frame 12. A key 19 is formed in one edge of frame 12 to provide card orientation.

Header 20 is a U shaped member having a base element 22 and two side elements 24 and 26. Side elements 24 and 26 have a slot 28 and 30 (not shown) respectively on their internal side. The interior dimension of header 20 and slots 28 and 30 are such as to receive card 10 in a sliding fit. Header 20 is typically bonded to the mother board of the host digital computer system for which card 10 is intended as an add in function.

Figure 2:
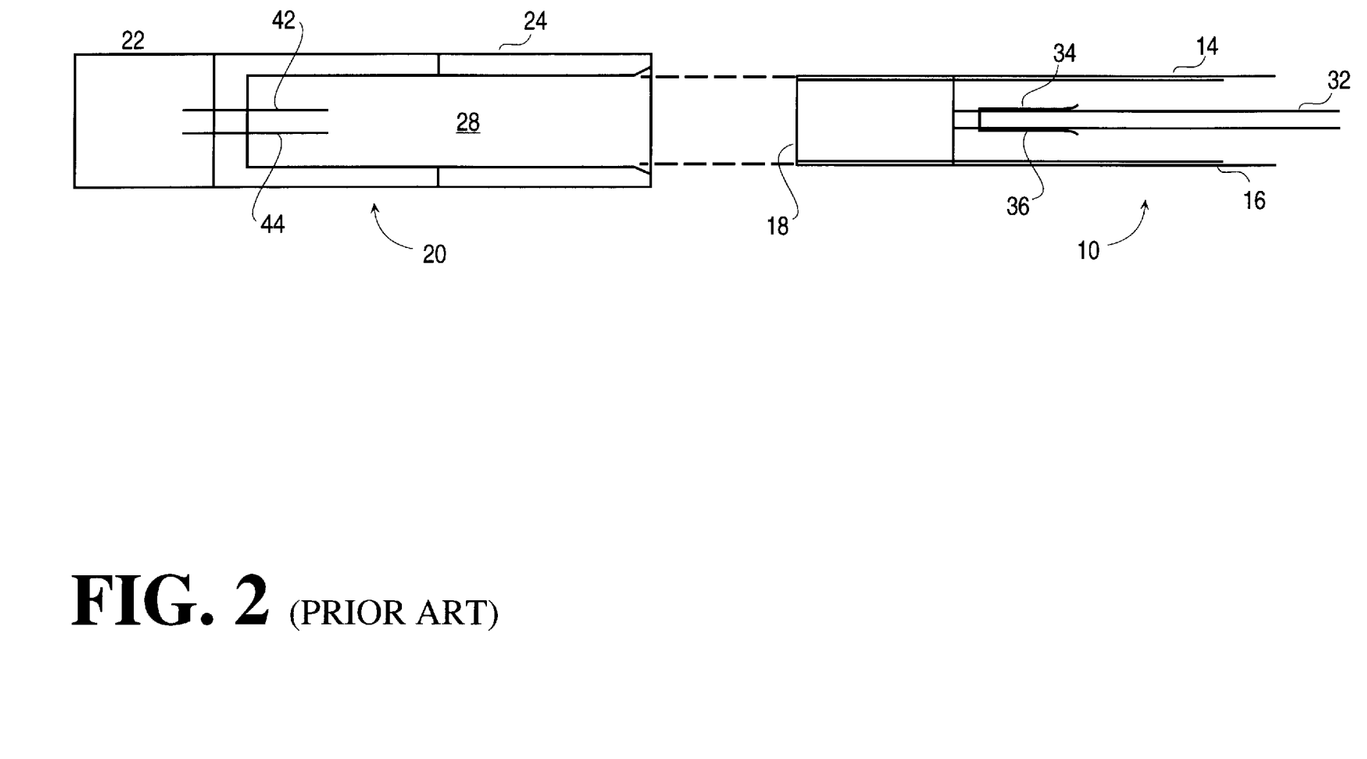
FIG. 2 is a cross section view taken longitudinally through card 10 and header 20 of FIG. 1.

FIG. 2 is a cross sectional view taken longitudinally through card 10 and header 20 of FIG. 1. Referring now to FIG. 2, 68 position connector 18 is bonded to covers 14 and 16. A printed circuit board 32 is supported along its edges in the long dimension by frame 12 (not shown in this Figure) and is shown schematically to be electrically connected to 68 position connector 18 by a plurality of internal contacts of which two are shown at reference numerals 34 and 36.

Printed circuit board 32 contains the electronic components and interconnect circuitry needed to create a subsystem that performs the functions for which the card was designed.

A 68 pin connector of which two pins 42 and 44 are shown is adapted to fit into 68 position connector 18 when card 10 is fully inserted into header 20. Leads from pins 42 and 44 pass base 22 of header 20 and are ultimately connected to a printed circuit board residing in the host digital computer system.

Figure 3:
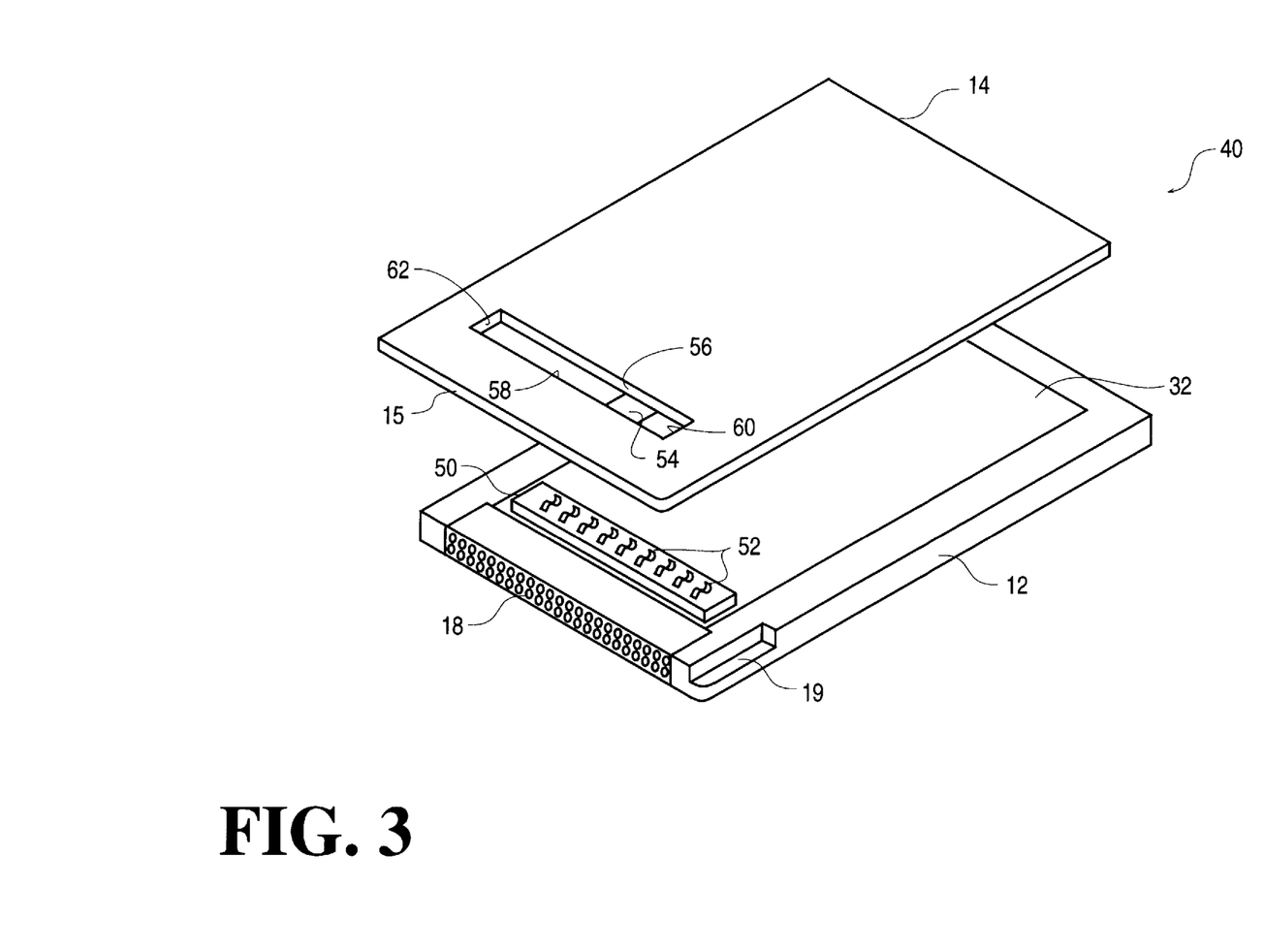
FIG. 3 is a partially exploded perspective view of a card conforming to the PCMCIA standard and containing the present invention.

FIG. 3 is a partially exploded perspective view of a PC card conforming to the PCMCIA standard and containing the present invention. The entire card is referenced by numeral 40. Top cover 14 is shown separated from frame 12 to expose the configuration of the present invention. A rectangularly shaped insulator block 50 is bonded to printed circuit board 32. Insulator block 50 is located in close proximity to 68 position connector 18. Preferably it is located within 0.1 inches. Imbedded in insulator block 50 are a plurality of interconnects 52.

Top cover 14 is a substantially flat sheet of material, preferably a metal such as stainless steel, and can be formed for Type I, Type II or Type III cards. It has dimensions consistent with the PCMCIA standard and contains a rectangular opening 54 located near the end containing connector 18. Opening 54 is defined by edge surfaces 56, 58, 60 and 62. Opening 54 is positioned in cover 14 so that interconnects 52 are accessible therethrough when card 40 is completely assembled.

Figure 4:
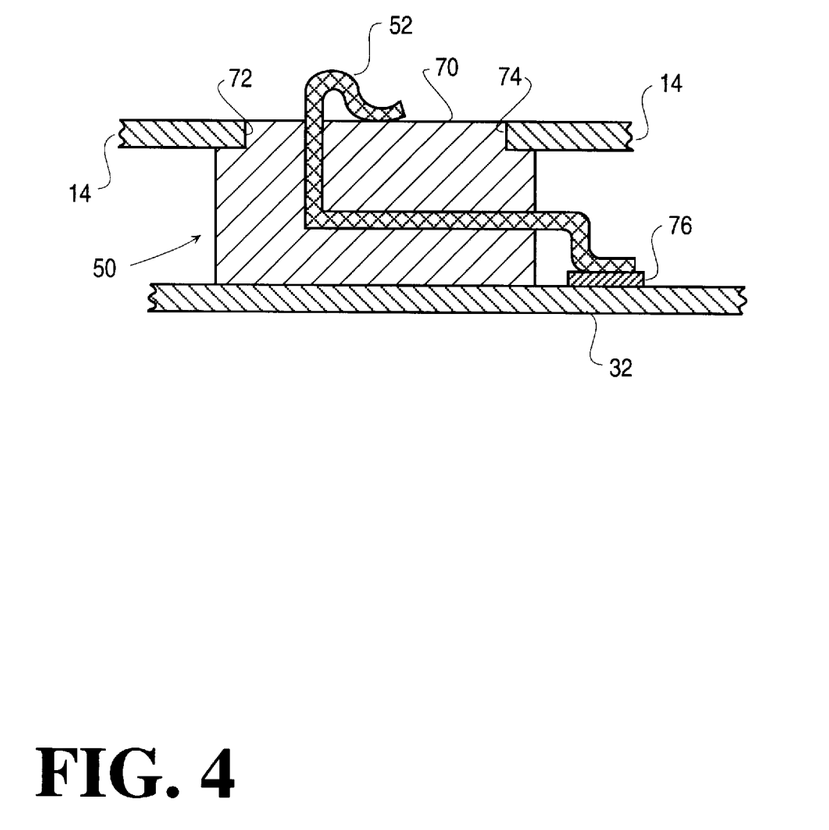
FIG. 4 is a cross sectional view of insulator an block assembly made according to the teaching of present invention.

FIG. 4 is a cross sectional view of insulator block 50. Referring to FIG. 4, insulator block 50 is bonded to printed circuit board 32. Insulator block 50 provides electrical insulation and mechanical form and support for interconnects 52. The upper surface 70 of insulator block 50 is recessed at each edge to form lips 72 and 74 which provide support surfaces for cover 14 along the periphery of opening 54. This support is crucial to preventing top cover 14 from deforming in use since the distance between surface 58 defining the front edge of opening 54 and the front edge 15 of card 14 is very small and thus that portion of the top cover is quite weak. This distance must be small since the additional signal contacts must be in close proximity to the front of the card.

Interconnect 52 passes through insulating block 50 and is soldered to pad 76 on printed circuit board 32. In its deformed state, the top surface of interconnect 52 is between 0.4 and 0.8 millimeters above the top surface 70 of insulator block 50.

Figure 5:
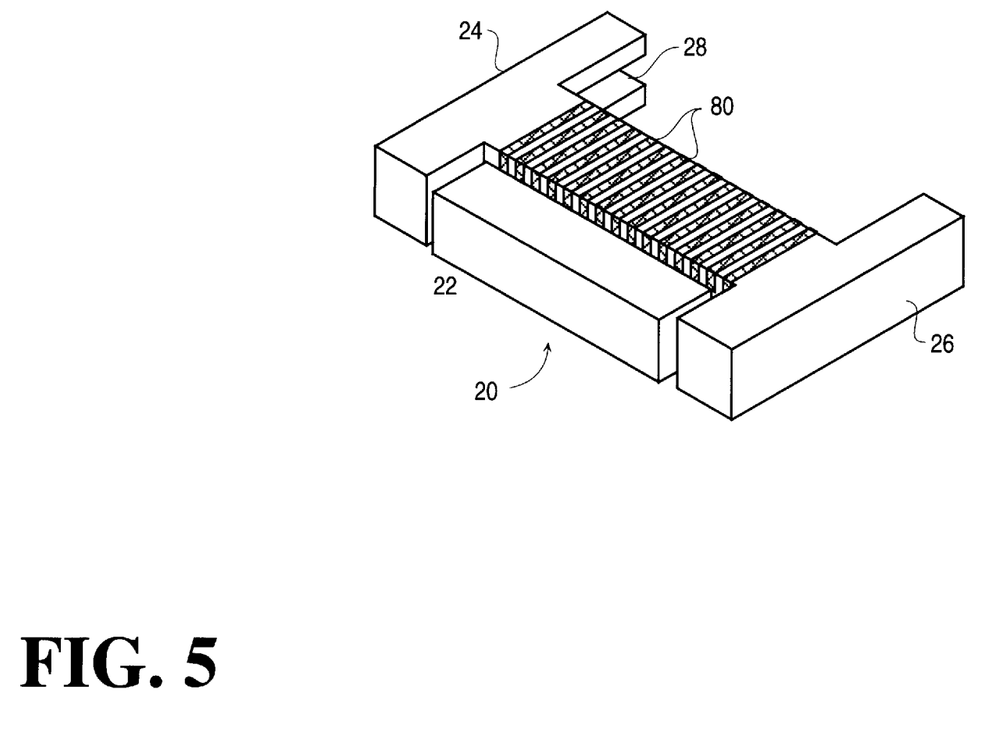
FIG. 5 is a perspective view of a header made according to the teaching of the present invention.

FIG. 5 is a perspective view of header 20. Referring now to FIG. 5, a plurality of conductors 80 run along the top surface of base element 22 of header 20.

Figure 6:
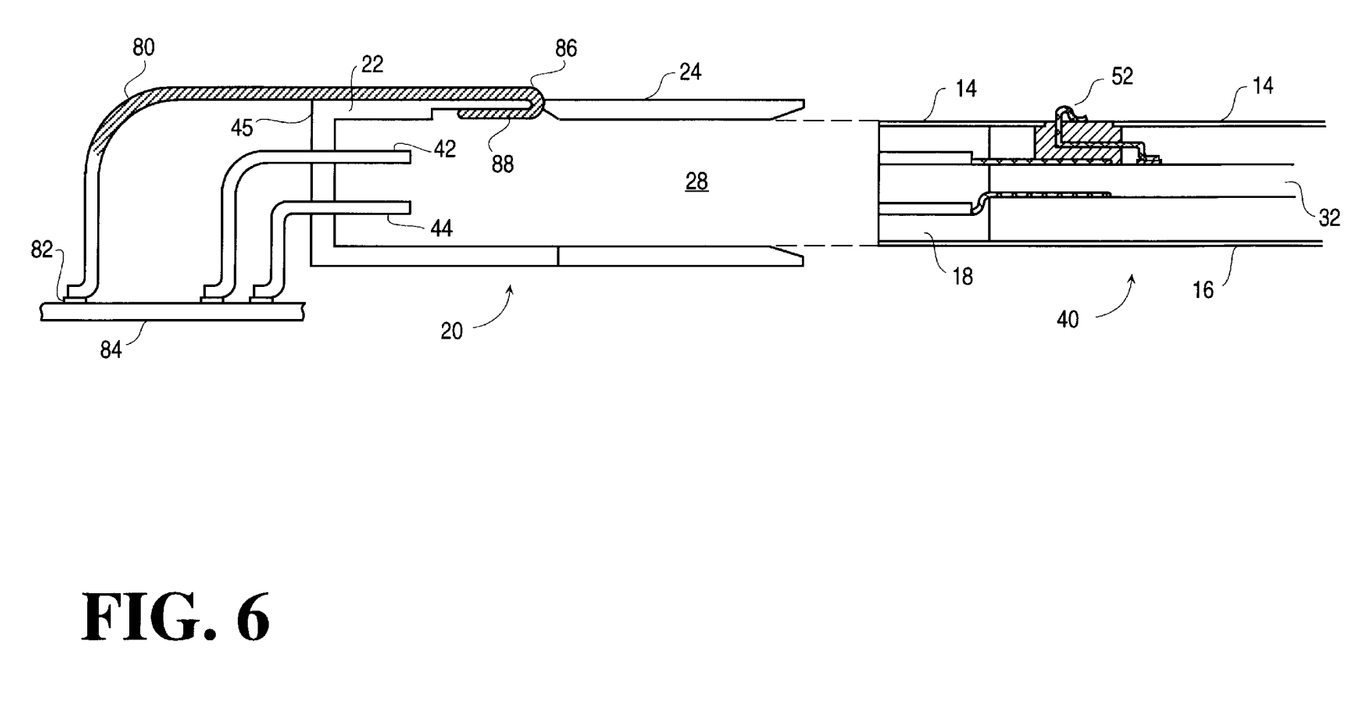
FIG. 6 is a cross section view of the card and header of FIGS. 4 and 5 which more clearly shows the improvements of the present invention.

FIG. 6 is a cross section view of card 40 and header 20 with the improvements of the present invention. The cross sectional cut is taken longitudinally through the center of card 40 and header 20. Referring now to FIG. 6, conductor 80 is soldered to pad 82 on mother board 84 which may be an integral part of the host digital computer system (not shown). Conductor 80 runs along the top surface of base element 22 of header 20 and wraps around the end thereof at reference numeral 86. From there it runs along the inner surface of base element 22 as shown at reference numeral 88. The portion of conductor 80 at reference numeral 88 is coated with gold and is the interconnect that mates with interconnect 52 on card 40.

As card 40 is inserted into slot 28, interconnect 52, which is fabricated from a compliant metal, is deformed causing it to exert an upward force. When card 40 is fully inserted into slot 28, interconnect 52 is in contact and exerting a force upon interconnect 88.

Pins 42 and 44 in 68 pin connector 45 fit into the matching sockets in connector 18. In this way, circuit board 32 is connected to circuit board 84 by both the 68 pin connector and up to 32 additional pins And this is accomplished while staying within the PCMCIA standard and thereby maintaining backward compatibility with previous generation PCMCIA cards.

Figure 7:
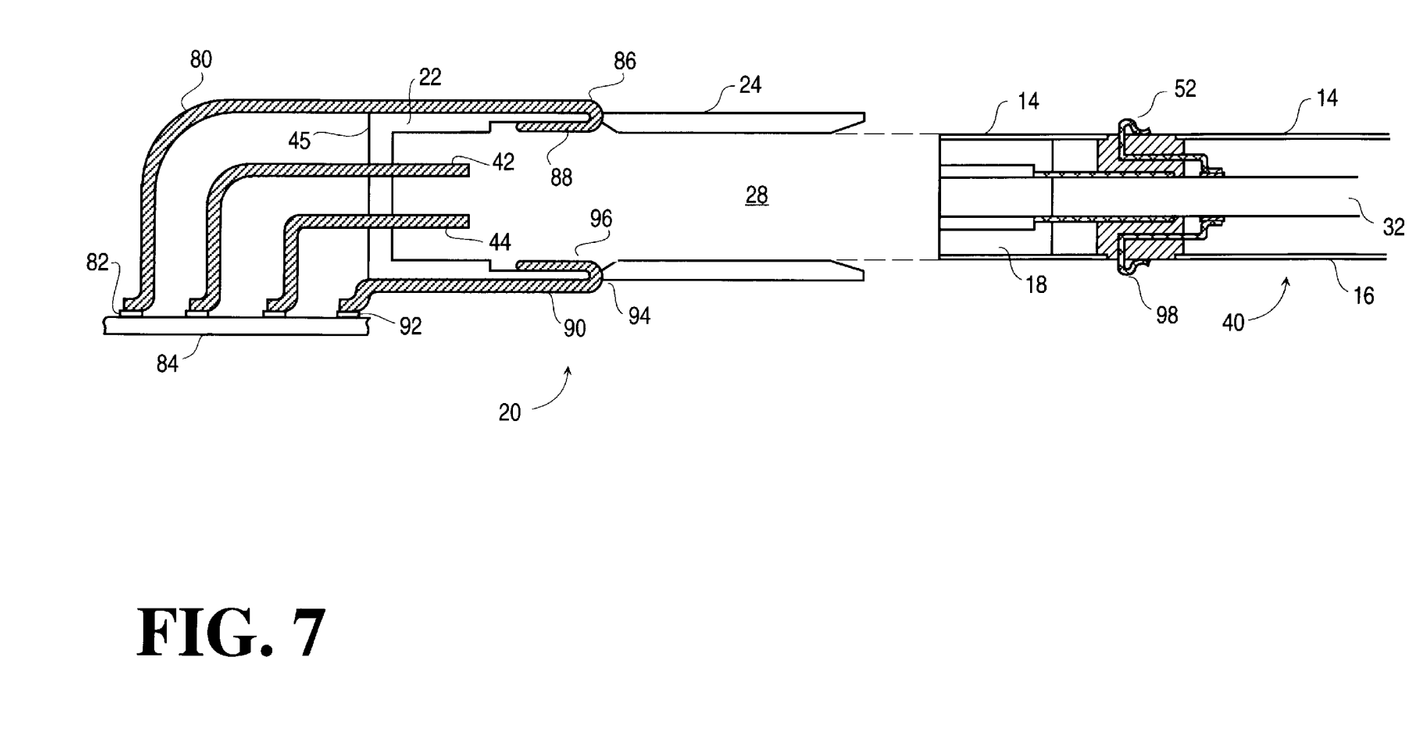
FIG. 7 is a cross section view of the card and header of FIGS. 4 and 5 showing two additional connectors.

It would be possible to have an identical configuration on the bottom of the card and thereby add up to 68 additional pins. FIG. 7 shows such a configuration and is a cross section view of card 40 and header 20 with the addition of a interconnects on the bottom as well as the top. The cross sectional cut is taken longitudinally through the center of card 40 and header 20. Referring now to FIG. 7, conductor 90 is soldered to pad 92 on mother board 84. Conductor 90 runs along the bottom surface of base element 22 of header 20 and wraps around the end thereof at reference numeral 94. From there it runs along the inner surface of base element 22 as shown at reference numeral 96. The portion of conductor 90 at reference numeral 96 is coated with gold and is the interconnect that mates with interconnect 98 on card 40.

Figure 8:
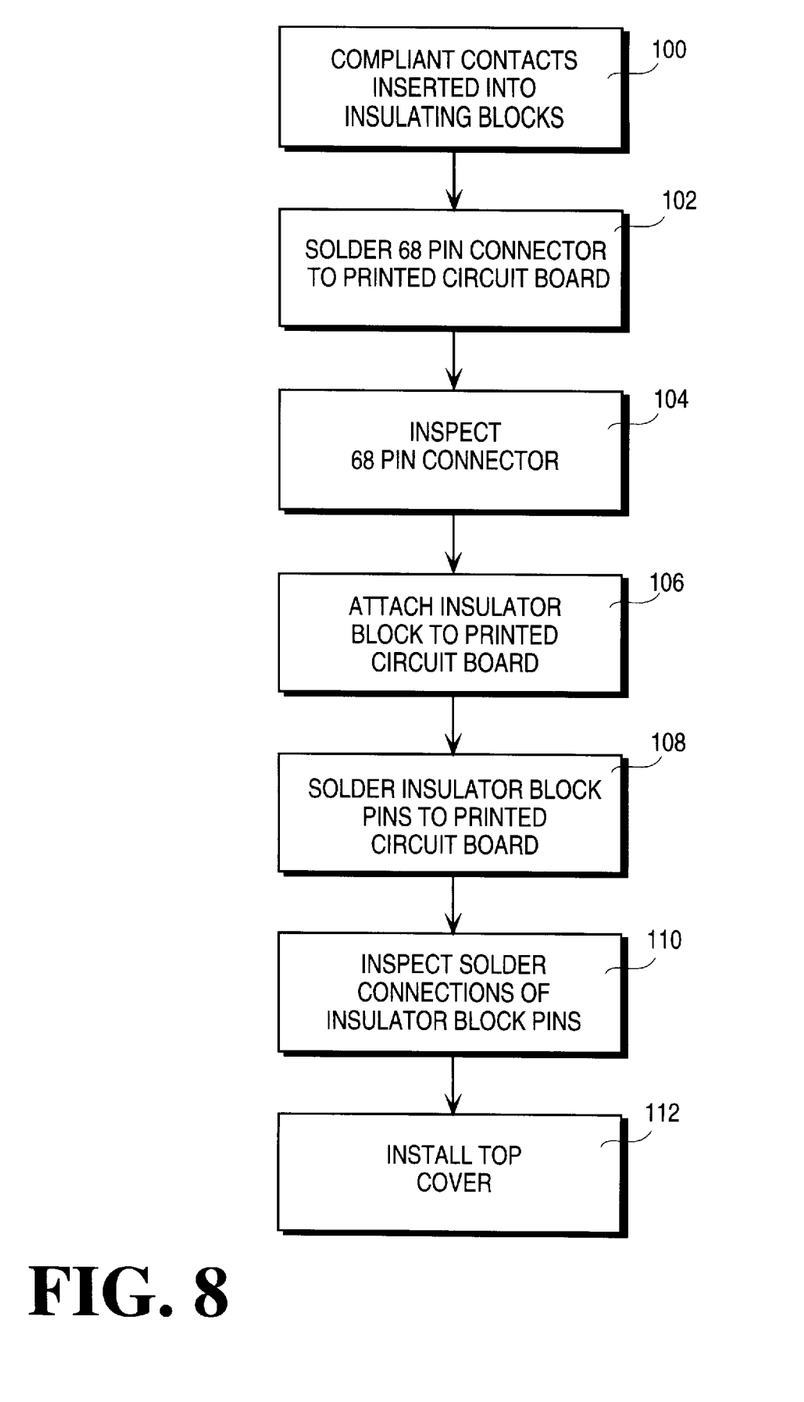
FIG. 8 is a flow chart of the manufacturing process for the card portion of the present invention.

FIG. 8 is a block diagram of the preferred manufacturing process. The design and manufacturing process have been worked out together to insure manufacturability at a low cost. Referring now to FIG. 8, the first step as illustrated in processing block 100 is to fabricate the interconnects 52 into insulator block 50. Interconnects 52 are stamped from a springy metal such as beryllium-copper and are coated with a thin film of highly conductive and corrosion resistant metal such as gold. Insulator block 50 is preferably a highly electrically insulating material such as a polycarbonate or a liquid crystal polymer and could be injection molded around a previously stamped and coated set of interconnects 52.

The next step is to solder 68 position connector 18 to printed circuit board 32 as illustrated by processing block 102. It is also possible that 68 position connector 18 and insulator block 50 with interconnects 52 could be manufactured and assembled as one piece.

The next step is to inspect the connections of 68 position connector 18 as illustrated by processing block 104.

The next step is to attach insulator block 50 to printed circuit board 32 as illustrated by processing block 106. This is done preferably with an adhesive such as epoxy or alternatively with snap-in features in insulator block 50 that lock into openings in printed circuit board 32.

The next step as shown by processing block 108 is to solder insulator block interconnect pins 52 to printed circuit board 32.

The next step as shown by processing block 110 is to inspect the solder connections 76 of insulator block 50.

The next step as shown by processing block 112 is to assemble top cover 14 and bottom cover 16 to frame 12. Metal covers 14 and 16 are bonded to frame 11 with an adhesive such as epoxy.

Figure 9:
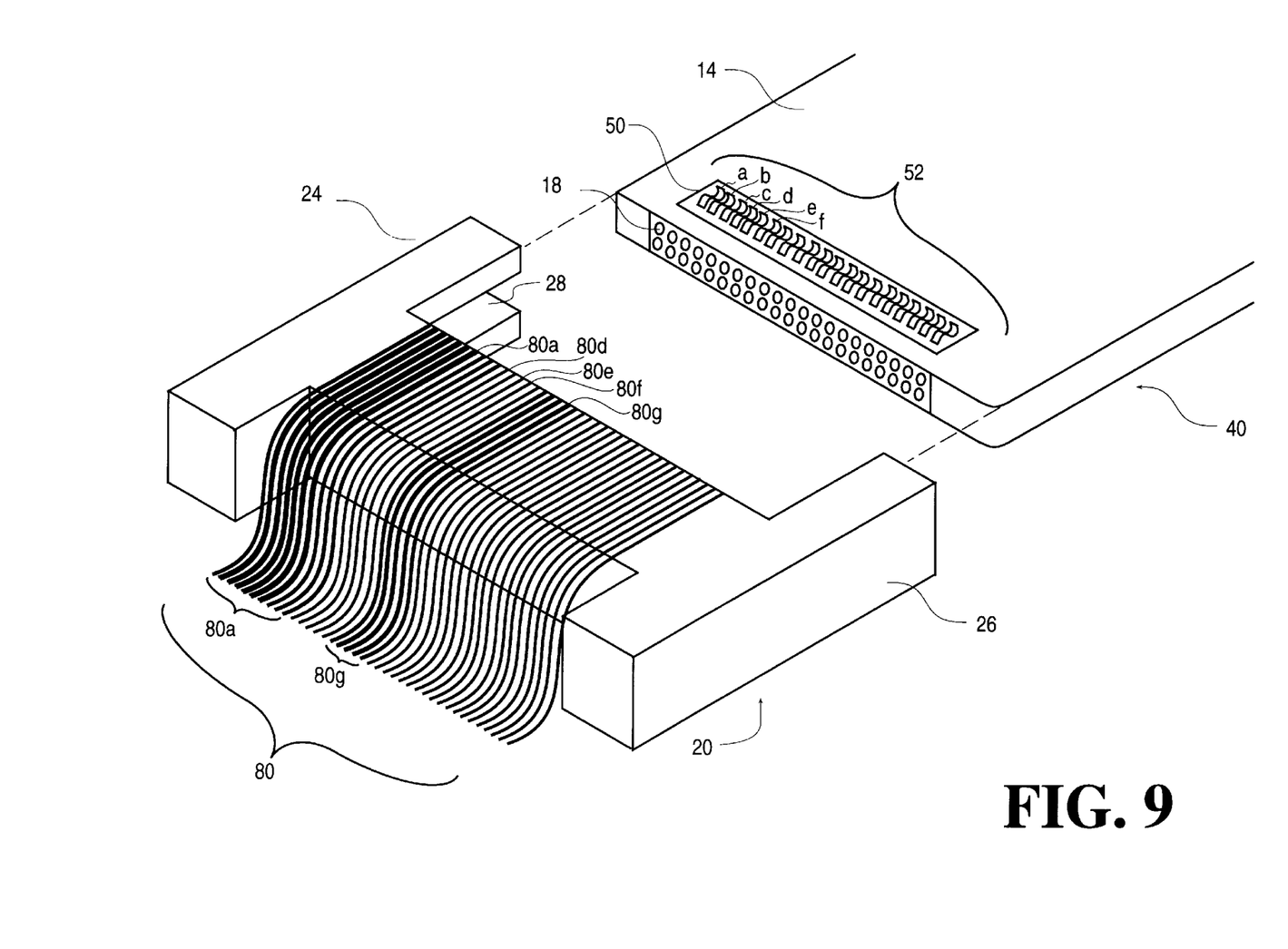
FIG. 9 is a perspective view of a card having discrete and common conductor regions.

According to another aspect of the invention, it may be desirable to have discreet interconnects 52 on card 40 mate with common conductor regions in header 20. FIG. 9 is a perspective view of a preferred embodiment of this aspect of the invention. Referring now to FIG. 9, all interconnects 52 are discrete conductive paths to printed circuit board 32 best shown in FIG. 6. However, interconnects 52a, 52b and 52c mate with a common conductor area 80a on header 20, and interconnects 52g, 52h and 52i mate with common conductor area 80g on header 20. In contrast, interconnects 52d, 52e and 52f mate with discrete conductors 80d, 80e and 80f on header 20. The remainder of interconnects 52 mate with discrete conductors 80. The common conductor regions can be used for grounding, supply voltage or another common connection. The embodiment shown in FIG. 9, is one of many combinations of connections between discreet and common conductor regions.

The foregoing preferred embodiment is subject to numerous adaptations and modifications without departing from the scope of the invention. Therefore, within the scope of the appended claims, the invention may be practiced other than as specifically described herein.

What is claimed is:

1. In an add in card for a host computer system consisting of (1) a card having a printed circuit board surrounded and supported by a rectangular frame having a long and short dimension, a first connector mounted to said frame along said short dimension and electrically connected to said printed circuit board and having top and bottom covers attached to said frame and thereby enclosing said printed circuit board and a portion of said first connector and (2) a header which is electrically and mechanically connected to said host computer and having a first connector included therein and electrically connected to said host computer, said first connector adapted to mate with the first connector in said card, the improvement comprising:

a plurality of electrically conductive interconnects mounted on said card substantially adjacent to said first connector, each of said plurality of electrically conductive interconnects being discretely connected electrically to said printed circuit board, said interconnects being accessible only through at least one of said covers of said card, and wherein a portion of said interconnects carry signals;

a plurality of conductors mounted to said header and electrically connected to said host computer and positioned to make electrical contact with each of said plurality of electrically conductive interconnects mounted on said card when said card is inserted into said header, said plurality of conductors being fewer in number than said plurality of interconnects such that two or more discrete interconnects mate with a common conductor area.

2. The improvement of claim 1 wherein said header comprises:

a U shaped member having a base element and two integrally connected side elements, said base element having a U shaped cross section defined by a vertical and two horizontal components and:

said plurality of conductors runs along the outside surface of said horizontal component around the edge of said horizontal component and along the inside surface of said horizontal component of said base element.

3. The improvement of claim 1 wherein said common conductive area of said plurality of conductors is at ground potential.

4. The improvement of claim 1 wherein said common conductive area of said plurality of conductors is at supply voltage potential.

5. The improved add in card system according to claim 1 wherein said add in card system conforms to the PCMCIA standard.

6. The improvement of claim 1 wherein said plurality of electrically conductive interconnects mounted on said card substantially adjacent to said first connector are mechanically deformable.

* * * * *